(12) United States Patent
Fahd et al.

(10) Patent No.: US 10,545,308 B2
(45) Date of Patent: Jan. 28, 2020

(54) FLAT DROP CABLE WITH FEATURES FOR ENHANCING STRIPABILITY

(71) Applicants: COMMSCOPE TECHNOLOGIES LLC, Hickory, NC (US); COMMSCOPE TELECOMMUNICATIONS (SHANGHAI) CO. LTD., Shanghai (CN); CommScope Technologies Australia Pty Ltd, Berkeley Vale, NSW (AU)

(72) Inventors: Aly Fahd, Troy, NY (US); Wayne M. Kachmar, North Bennington, VT (US); Steven James Dick, South Croydon (AU); Paul David Hubbard, Castle Hill (AU); Wei Fu, Shanghai (CN); Dong Xu, Shanghai (CN)

(73) Assignees: CommScope Technologies LLC, Hickory, NC (US); CommScope Technologies Australia Pty Ltd. (AU); CommScope Telecommunications (Shanghai) Co., Ltd. (CN)

( * ) Notice: Subject to any disclaimer, the term of this patent is extended or adjusted under 35 U.S.C. 154(b) by 0 days.

(21) Appl. No.: 16/214,879

(22) Filed: Dec. 10, 2018

(65) Prior Publication Data

US 2019/0187398 A1 Jun. 20, 2019

Related U.S. Application Data

(63) Continuation of application No. 15/113,713, filed as application No. PCT/CN2014/071119 on Jan. 22, 2014, now Pat. No. 10,151,899.

(51) Int. Cl.
*G02B 6/44* (2006.01)
*G02B 6/245* (2006.01)

(52) U.S. Cl.
CPC ......... *G02B 6/4495* (2013.01); *G02B 6/4402* (2013.01); *G02B 6/4432* (2013.01);
(Continued)

(58) Field of Classification Search
CPC .. G02B 6/4495; G02B 6/4494; G02B 6/4432; G02B 6/4402
See application file for complete search history.

(56) References Cited

U.S. PATENT DOCUMENTS

| 4,089,585 A | 6/1978 | Slaughter et al. |
| 4,199,225 A | 4/1980 | Chadwick et al. |

(Continued)

FOREIGN PATENT DOCUMENTS

| CN | 202258546 U | 5/2012 |
| CN | 202393952 U | 8/2012 |

(Continued)

OTHER PUBLICATIONS

English machine translation of JP2011-186156 (Year: 2011).*

(Continued)

*Primary Examiner* — John Bedtelyon
(74) *Attorney, Agent, or Firm* — Merchant & Gould P.C.

(57) ABSTRACT

A flat drop cable has notches or other structures for enhancing the stripability of the jacket from the a core of the flat drop cable. The notches can have an angled configuration with surfaces that converge as the notch extends into the jacket. Inner edges of the notches can be positioned along a tear path that intersects the core of the flat drop cable. For example, the notches can be offset from a minor axis of the flat drop cable a sufficient distance such that the notches are positioned outside a central boundary region that extends tangent to sides of the core and parallel to the minor axis of the flat drop cable.

18 Claims, 5 Drawing Sheets

(52) U.S. Cl.
CPC ............ *G02B 6/4494* (2013.01); *G02B 6/245* (2013.01); *G02B 6/4433* (2013.01)

(56) References Cited

U.S. PATENT DOCUMENTS

| | | |
|---|---|---|
| 4,359,598 A | 11/1982 | Dey et al. |
| 4,729,628 A | 3/1988 | Kraft et al. |
| 4,761,053 A | 8/1988 | Cogelia et al. |
| 4,852,965 A | 8/1989 | Mullin et al. |
| 5,448,670 A | 9/1995 | Blew et al. |
| 5,737,470 A | 4/1998 | Nagano et al. |
| 5,982,966 A | 11/1999 | Bonicel |
| 6,101,305 A | 8/2000 | Wagman et al. |
| 6,370,303 B1 | 4/2002 | Fitz et al. |
| 6,493,491 B1 | 12/2002 | Shen et al. |
| 6,501,888 B2 | 12/2002 | Gimblet et al. |
| 6,542,674 B1 | 4/2003 | Gimblet |
| 6,621,964 B2 | 9/2003 | Quinn et al. |
| 6,714,710 B2 | 3/2004 | Gimblet |
| 6,744,954 B1 | 6/2004 | Tanaka et al. |
| 6,836,603 B1 | 12/2004 | Bocanegra et al. |
| 7,197,215 B2 | 3/2007 | Baird et al. |
| 7,539,380 B1 | 5/2009 | Abernathy et al. |
| 7,567,741 B2 | 7/2009 | Abernathy et al. |
| 7,796,853 B2 | 9/2010 | Abernathy et al. |
| 8,184,935 B2 | 5/2012 | Kachmar |
| 8,238,706 B2 | 8/2012 | Kachmar |
| 8,290,320 B2 | 10/2012 | Kachmar |
| 8,363,994 B2 | 1/2013 | Kachmar |
| 8,538,216 B2 | 9/2013 | Abernathy et al. |
| 8,712,200 B1 | 4/2014 | Abernathy et al. |
| 2006/0291787 A1 | 12/2006 | Seddon |
| 2007/0098339 A1 | 5/2007 | Bringuier et al. |
| 2014/0338968 A1 | 11/2014 | Kachmar |

FOREIGN PATENT DOCUMENTS

| | | | |
|---|---|---|---|
| CN | 202522741 U | 11/2012 | |
| CN | 203025396 U | 6/2013 | |
| JP | 200747680 A | 2/2007 | |
| JP | 2011-186156 | * 9/2011 | ........... G02B 6/4433 |
| WO | 2010/039530 A1 | 4/2010 | |

OTHER PUBLICATIONS

International Search Report and Written Opinion of the International Searching Authority for International Patent Application No. PCT/CN2014/071119 dated Jul. 29, 2014, 12 pgs.
Extended European Search Report for Application No. 14880289.5 dated Nov. 7, 2017.

* cited by examiner

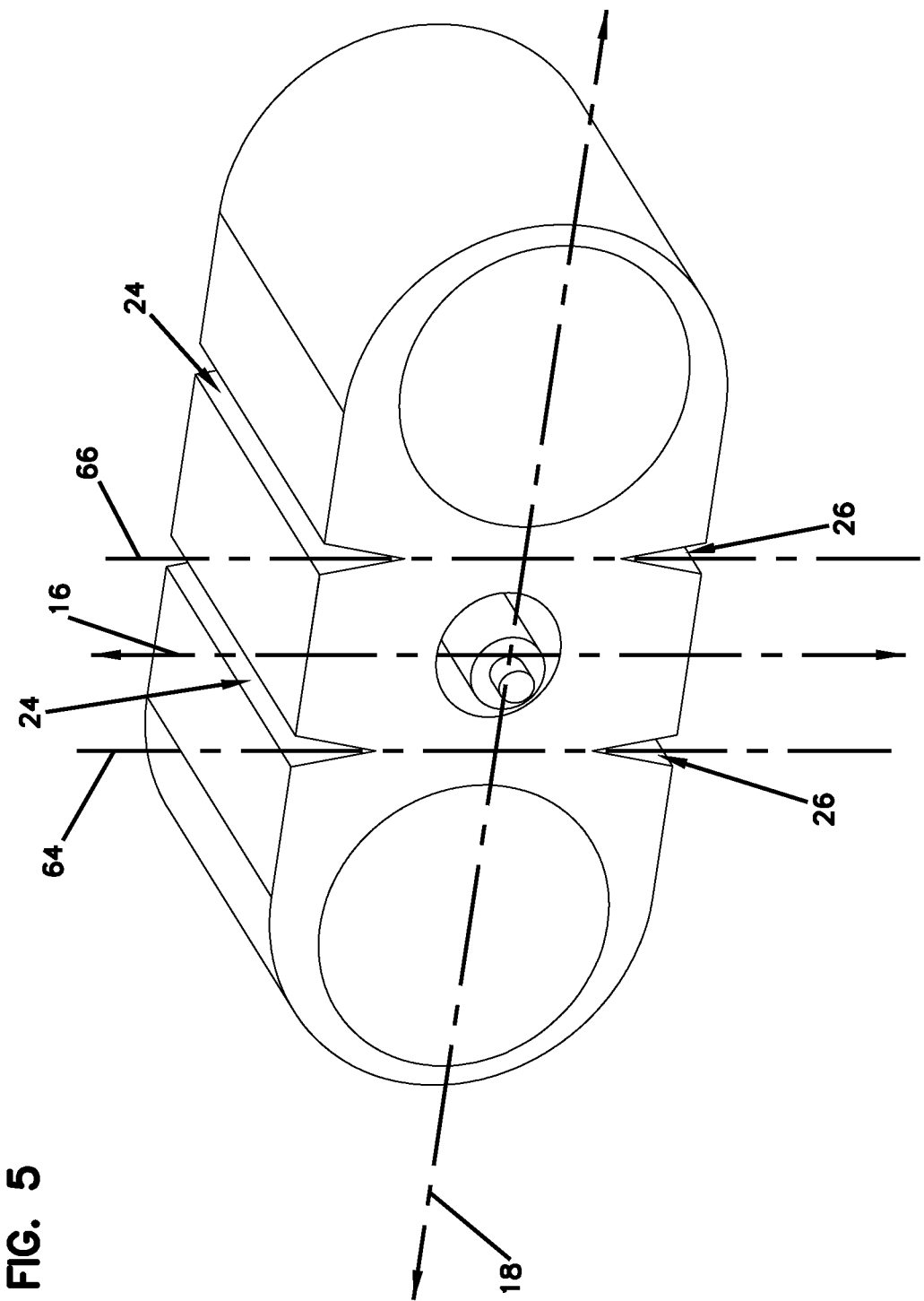

FLAT DROP CABLE WITH FEATURES FOR ENHANCING STRIPABILITY

This application is a Continuation of U.S. patent application Ser. No. 15/113,713, filed 22 Jul. 2016, now U.S. Pat. No. 10,151,899, which is a National Stage Application of PCT/CN2014/071119, filed 22 Jan. 2014 and which applications are incorporated herein by reference. To the extent appropriate, a claim of priority is made to the above disclosed applications.

TECHNICAL FIELD

The present disclosure relates generally to fiber optic cables. More particularly, the present disclosure relates to flat drop cables.

BACKGROUND

A fiber optic cable typically includes: (1) an outer jacket; (2) a core including at least one optical fiber positioned within the jacket; and (3) a plurality of reinforcing members positioned within or incorporated into the core. The optical fiber functions to carry optical signals. A typical optical fiber includes an inner core surrounded by a cladding that is protected by a coating layer. The core can also include a buffer layer that functions to surround and protect the coated optical fiber. In certain examples, the buffer layer can include a tight buffer layer, a semi-type buffer layer, or a loose buffer layer. The reinforcing members of the fiber optic cable add mechanical reinforcement to the fiber optic cable to protect the internal optical fiber against stresses applied to the cable during installation and thereafter. The outer jacket can be configured to protect the optical fiber by preventing the fiber from being exposed to outside elements.

Drop cables used in fiber optic networks can be constructed with jackets each having a flat transverse cross-sectional profile. Such cables typically include at least one central buffer tube containing at least one optical fiber, and reinforcing members such as rods made of glass reinforced epoxy embedded in the jacket on opposite sides of the buffer tube. U.S. Pat. No. 6,542,674 discloses a drop cable of the type described above. Flat drop cables of the type described above are designed to be quite robust. However, as a result of such cables being strong and robust, stripping can be difficult. Improvements are needed in this area.

SUMMARY

One aspect of the present disclosure relates to a flat drop cable having one or more structures for enhancing the stripability of the jacket from the drop cable. In certain examples, the structures for enhancing stripability can include notches. In certain examples, the notches can have an angled configuration with surfaces that converge as the notch extends into the jacket. In certain examples, the flat drop cable can define an elongated transverse cross-sectional profile having a major axis and a minor axis, and one or more notches for enhancing stripability can be offset from the minor axis of the flat drop cable. In certain examples, at least two offset notches are provided at opposite sides of the drop cable with inner edges of the notches being positioned along a plane that intersects an optical fiber of the flat drop cable. In certain examples, the notches are offset from the minor axis a sufficient distance such that the notches are positioned outside a central boundary region defined by spaced lines that are tangent to sides of a core of the fiber optic cable and that are parallel to the minor axis.

A variety of additional aspects will be set forth in the description that follows. These aspects can relate to individual features and to combinations of features. It is to be understood that both the forgoing general description and the following detailed description are exemplary and explanatory only and are not restrictive of the broad concepts upon which the examples disclosed herein are based.

BRIEF DESCRIPTION OF THE DRAWINGS

FIG. 5 is a perspective view showing a segment of still another flat drop cable in accordance with the principles of the present disclosure.

DETAILED DESCRIPTION

Figure 1:
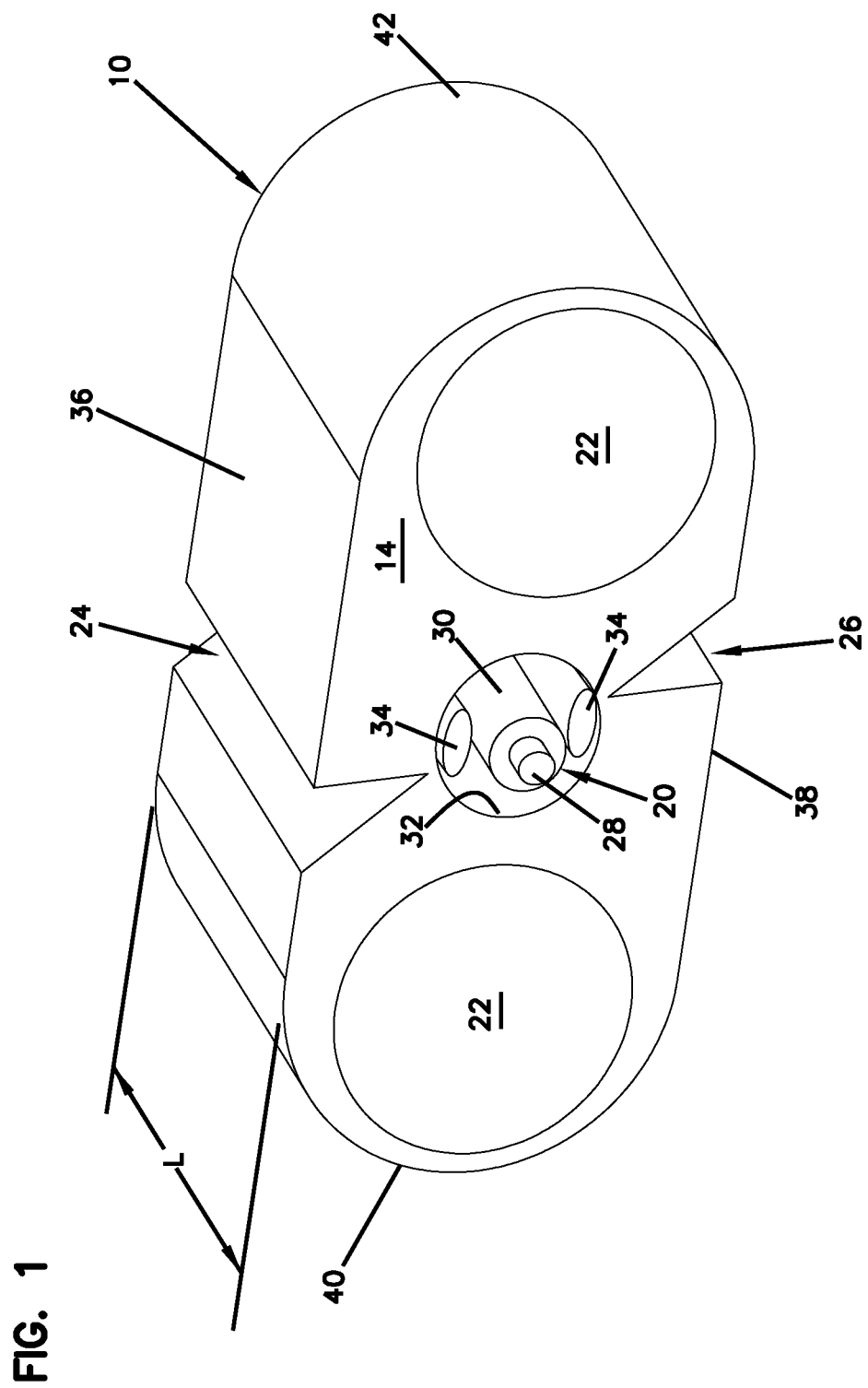
FIG. 1 is a perspective view of a segment of a flat drop cable in accordance with the principles of the present disclosure.
Figure 2:
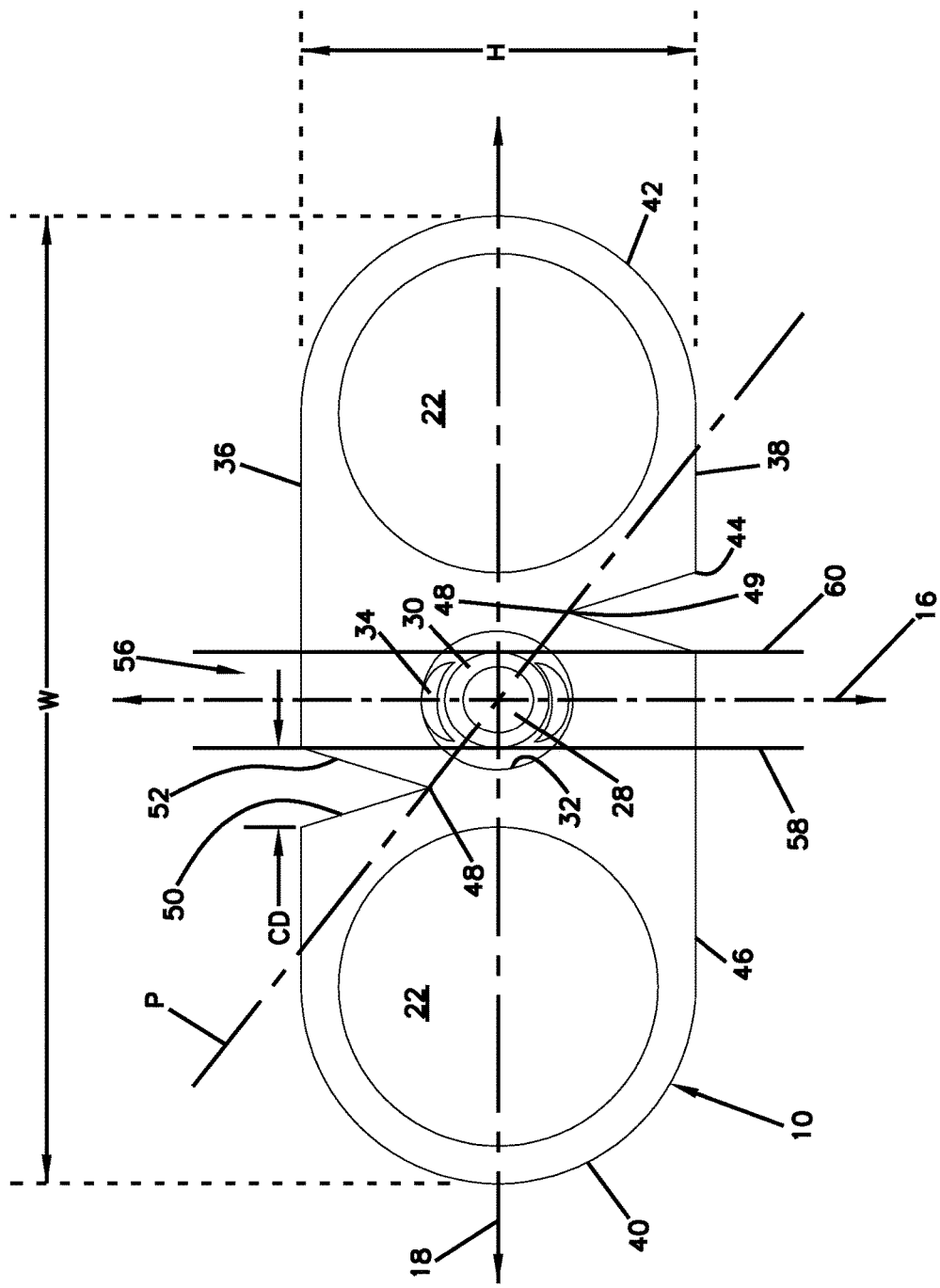
FIG. 2 is a transverse cross-sectional view of the flat drop cable of FIG. 1.

FIGS. 1 and 2 show a fiber optic cable 10 in accordance with the principles of the present disclosure. The fiber optic cable 10 includes a jacket 14, a core 20 disposed within the jacket 14, and cable reinforcing members 22 positioned within the jacket 14. The fiber optic cable 10 further includes structures for enhancing the stripability of the jacket 14 relative to the core 20. In the depicted example, such structures can include notches 24, 26 defined within the jacket 14.

The depicted fiber optic cable 10 is shown as a flat drop cable having a length L, a width W, and a thickness T. The fiber optic cable 10 includes a central longitudinal axis 12 that extends along the length L of the fiber optic cable 10. The jacket 14 of the cable 10 has a transverse cross-sectional profile that is elongated such that the width W is larger than the thickness T. The transverse cross-sectional profile of the jacket 14 defines a minor axis 16 that extends along the thickness T and a major axis 18 that extends along the width W. The minor and major axes 16, 18 are perpendicular relative to one another and intersect at the central longitudinal axis 12 of the fiber optic cable 10.

The core 20 of the fiber optic cable 10 is centered generally along the central longitudinal axis 12. The cable reinforcing members 22 are positioned on opposite sides of the minor axis 16. The notches 24, 26 or other structures for enhancing the stripability of the jacket 14 relative to the core 20 are disposed at locations offset from the minor axis 16.

Referring still to FIGS. 1 and 2, the core 20 of the fiber optic cable 10 includes an optical fiber 28 and a buffer layer 30 that surrounds the optical fiber 28. In certain examples, the optical fiber 28 can include a core, a cladding layer surrounding the core, and one or more polymeric coatings surrounding the cladding layer. In certain examples, the buffer layer 30 can include a buffer tube such as a tight buffer tube, a loose buffer tube, or a semi-tight buffer tube. In other examples, the core 20 may include more than one optical fiber 28. In certain examples, the core 20 extends along the entire length L of the fiber optic cable 10.

The cable reinforcing members 22 extend along the length L of the fiber optic cable 10 and are aligned along the minor axis 18 of the transverse cross-sectional profile of the fiber optic cable 10. As described above, the cable reinforcing members 22 are positioned on opposite sides of the minor axis 16 of the transverse cross-sectional profile of the fiber optic cable 10. In certain examples, the cable reinforcing members 22 can be configured to provide the fiber optic cable 10 with both tensile and compressive reinforcement. In certain examples, cable reinforcing members 22 can have a construction that includes epoxy reinforced with fiberglass. In other examples, the cable reinforcing members 22 can include Aramid yarn, metal rods or other structures.

The jacket 14 defines a central passage 32 in which the core 20 is positioned. In certain examples, strength members 34 such as water soluble fiberglass strands can be provided in the central passage 32. In certain examples, the strength members 34 can prevent the core 20 from sticking to or being contacted by the jacket 14. In this way, fiber performance will not be affected by strain applied to the jacket. In certain examples, the jacket 14 includes polyethylene. In certain examples, central passage 32 is larger than the core 20 such that the core is loosely provided within the central passage 32. In certain examples, the strength members 34 assist in centering the core 20 within the central passage 32 and in preventing the core 20 from adhering to the jacket 14 during extrusion. In certain examples, the strength members 34 can include a water soluble material that swells when exposed to water so as to inhibit the intrusion of water along the central passage 32.

The jacket 14 of the fiber optic cable 10 includes opposite top and bottom sides 36, 38 that extend between opposite rounded ends 40, 42. The thickness T of the fiber optic cable 10 extends between the top and bottom sides 36, 38 while the width W of the fiber optic cable 10 extends between the rounded ends 40, 42. In the depicted example, the top and bottom sides 36, 38 are generally parallel and flat.

The notches 24, 26 are provided for facilitating stripping the jacket 14 from the core 20. As shown at FIGS. 1 and 2, the notch 24 is provided at the top side 36 of the jacket 14 and the notch 26 is provided at the bottom side 38 of the jacket 14. The notches 24, 26 have lengths that extend along the length L of the fiber optic cable 10. Each of the notches 24 26 includes an open end 44 positioned at an exterior boundary 46 of the jacket 14 and a closed end 48 within an interior of the jacket 14. In certain examples, the open end 44 has a cross dimension CD that is larger than a corresponding cross dimension of the closed end 48. In one example, closed end 48 is defined by an edge having a cross dimension of essentially zero. In certain examples, the edge extends along the length L of the fiber optic cable 10 and is parallel to the central longitudinal axis 12. In certain examples, each of the notches 24, 26 has an angled or tapered configuration when viewed in transverse cross-section. For example, each of the notches 24, 26 can be defined by surfaces 50, 52 that converge as the surfaces 50, 52 extend in a direction from the open end 44 to the closed end 48. In certain examples, the closed ends 48 are defined by edges 49.

Referring to FIG. 2, the notches 24, 26 are offset from the minor axis 16 and are positioned on opposite sides of the minor axis 16. For example, the notch 24 is positioned between the minor axis 16 and the rounded end 40 of the jacket 14 while the notch 26 is positioned between the minor axis 16 and the rounded end 42 of the jacket 14. In certain examples, the notches 24, 26 are positioned completely outside of a central boundary 56 defined between a first reference plane 58 (depicted in FIG. 2 as a vertical line) and a second reference plane 60 (depicted in FIG. 2 as a vertical line). The first reference plate 58 is positioned on one side of the minor axis 16 and is tangent to the core 20. The second reference plane 60 is positioned on an opposite side of the minor axis 16 and is tangent to the core 20. In the depicted example, the first and second reference planes 58, 60 are perpendicular relative to the major axis 18.

Suitable positioning of the inner edges 49 of the notches 24, 26 can facilitate stripping the jacket 14 from the core 20 and accessing the core 20 after stripping. In certain examples, the edges 49 are positioned along a reference plane P that intersects the core 20. In the depicted example, the reference plane P intersects the edges 49 and also intersects the central longitudinal axis 12 of the core 20. The notches 24, 26 form a tear path aligned along the reference plane P.

For example, in certain implementations, a diagonal tear path is defined between the edges 49 of the notches 24, 26. The diagonal tear path 49 intersects the core 20. In the depicted example, the jacket 14 is provided with only one diagonal tear path.

In certain examples, the notches 24, 26 are laterally offset from one another so that the edges 49 are not positioned along a reference plane that is perpendicular relative to the major axis 18. In the example shown in FIG. 2, only one notch is provided at the top side 36 of the jacket 14 and only one notch is provided at the bottom side 38 of the jacket 14; the notches are provided on opposite sides of the minor axis 16.

In certain examples, the surfaces 50, 52 defining the notches 24, 26 are oriented at oblique angles relative to one another and intersect at edges 49. In certain examples, the edges 49 are offset from the minor axis 16. In certain examples, the edges 49 of the notches 24, 26 are offset on opposite sides of the minor axis 16 from one another.

Figure 3:
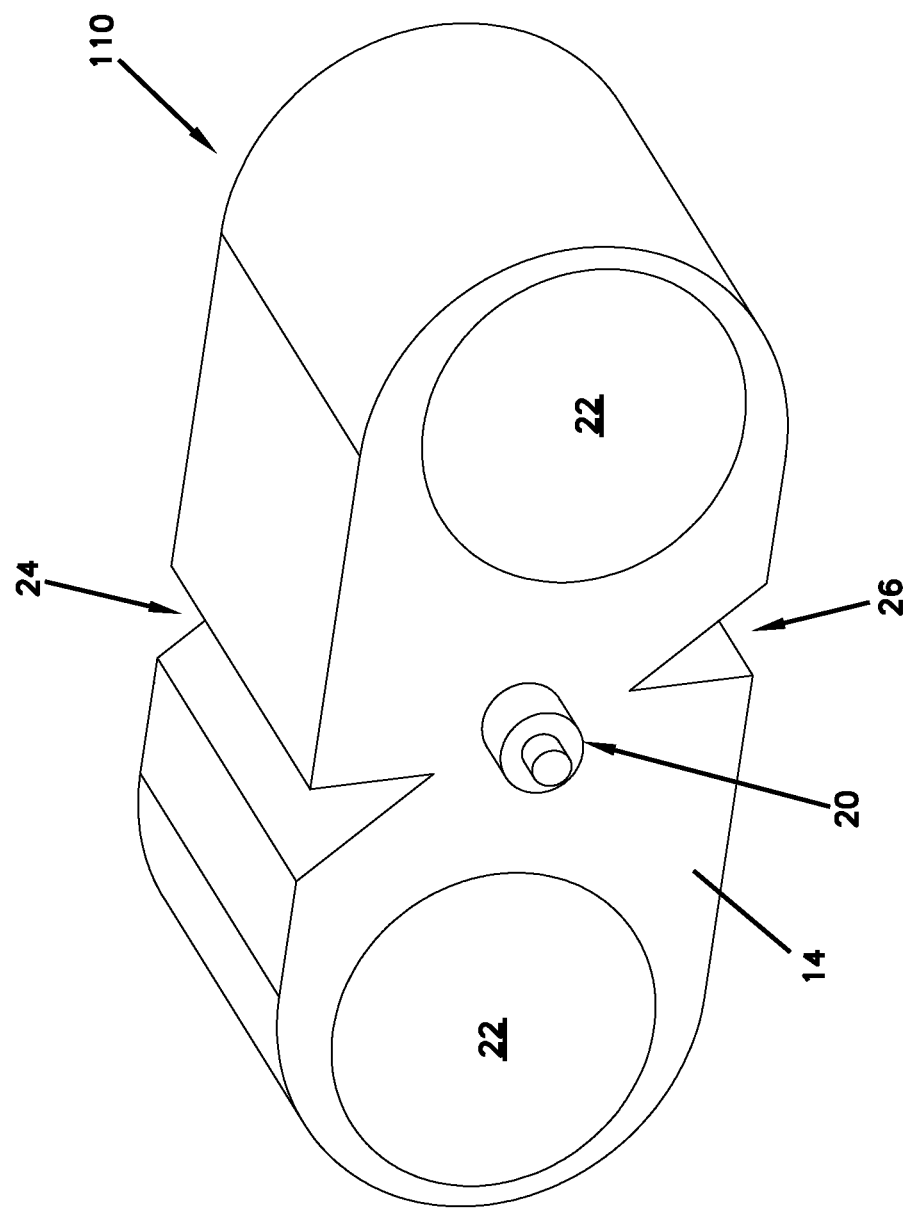
FIG. 3 is a perspective view of a segment of another flat drop cable in accordance with the principles of the present disclosure.

FIG. 3 shows another fiber optic cable 110 in accordance with the principles of the present disclosure. The fiber optic cable 110 has the same basic configuration as the fiber optic cable 10 except the jacket 14 is tightly extruded about the core 20 and no strength members 34 are provided between the core 20 and the jacket 14.

Figure 4:
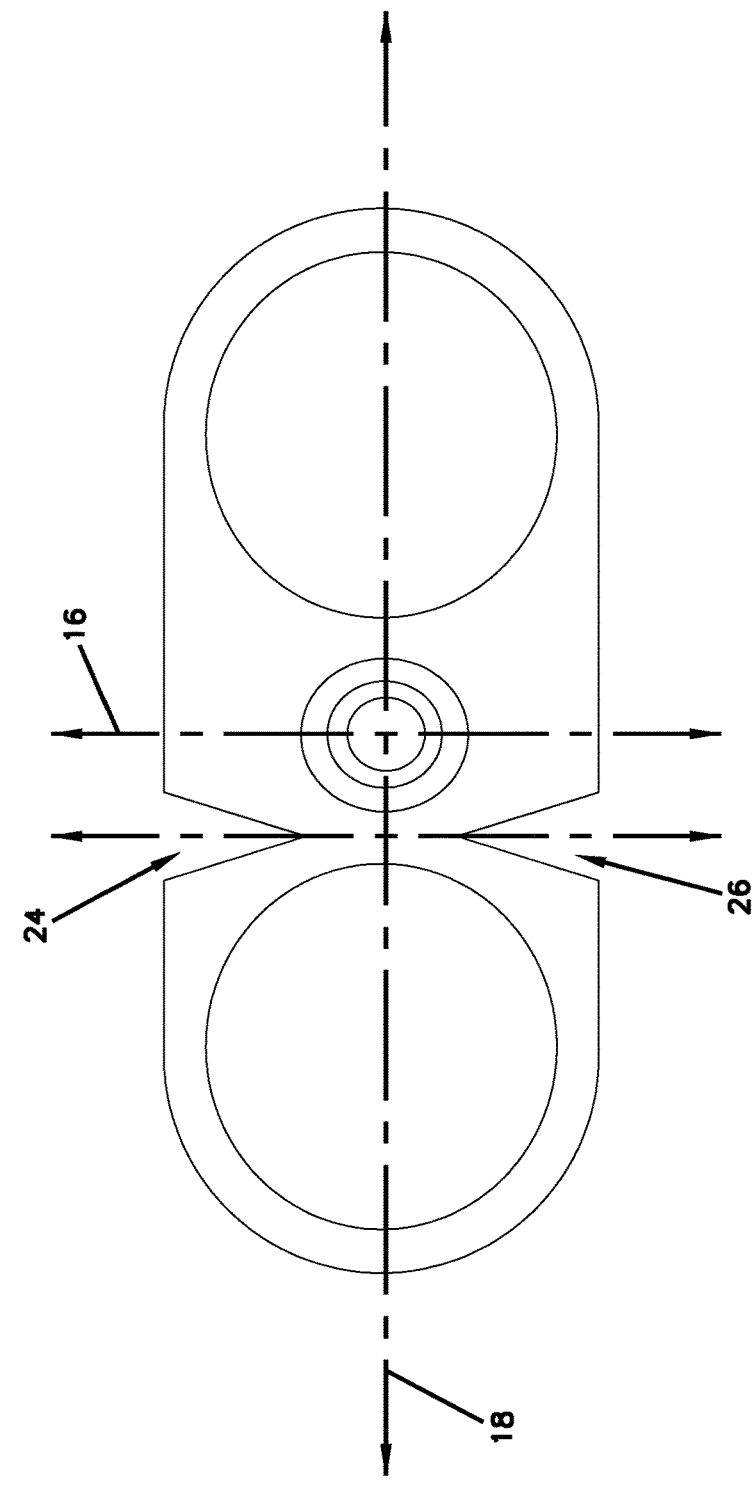
FIG. 4 is a transverse cross-sectional view of a further flat drop cable in accordance with the principles of the present disclosure.

FIG. 4 illustrates a further fiber optic cable 210 in accordance with the principles of the present disclosure. The fiber optic cable 210 includes top and bottom notches 24, 26 positioned on the same side of the minor axis 16. The notches 24, 26 are aligned along a reference plane 62 that does not intersect the core 20. The reference plane 62 is perpendicular relative to the major axis 18.

FIG. 5 illustrates still another fiber optic cable 310 in accordance with the principles of the present disclosure. The fiber optic cable 310 includes two sets of notches 24, 26 positioned on opposite sides of the minor axis 16. The notches 24, 26 of the first set are positioned along a reference plane 64 that is offset to the left of the minor axis 16 while the notches 24, 26 of the second set of notches is provided along a reference plane 66 that is offset to the right of the minor axis 16. The reference planes 64, 66 do not intersect the core 20 and are perpendicular relative to the major axis 18.

A further fiber optic cable in accordance with the principles of the present disclosure includes top and bottom notches positioned on opposite sides of a central boundary defined between a first reference plane and a second reference plane positioned on opposite sides of and tangent to the central passage. In some implementations, the notches are offset from the central boundary. Each of the notches has a first side that converges with a second side as the sides-extend into the jacket. In certain implementations, the second side of each notch extends generally parallel with the minor axis of the cable. In certain implementations, the second side of each notch extends generally orthogonal with the major axis of the cable.

The above specification provides examples of how certain inventive aspects may be put into practice.

What is claimed is:

1. A fiber optic cable having a longitudinal axis, the fiber optic cable comprising:
   a jacket having a length extending along the longitudinal axis, the jacket has a transverse cross-sectional profile defining a major axis extending between opposite first and second sides of the cable and a minor axis extending between opposite first and second ends of the cable, the major axis being transverse to the minor axis, the jacket having a flat construction so that the major axis is at least twice as long as the minor axis, the jacket having a curvature at the first and second sides of the cable so that the major axis extends through the curvature:
   a core disposed within the jacket and extending along the longitudinal axis, the core including at least one optical fiber, the core being intersected by both the major and minor axes;
   first and second strength members disposed within the jacket and extending along the longitudinal axis, the first and second strength members being positioned at opposite sides of the core so that the major axis intersects both the first and second strength members and the core, each of the first and second strength members having a rounded portion that matches the curvature of the jacket at a respective one of the first and second sides;
   a first open-sided notch defined by the jacket that extends along the length of the jacket at the first end of the jacket, the first open-sided notch being defined by respective first and second surfaces that converge at a first convergence point offset into the jacket from the first end of the jacket, the respective first surface extending from the first convergence point towards the first side of the jacket and the respective second surface extending from the first convergence point towards the second side of the jacket; and
   a second open-sided notch defined by the jacket that extends along the length of the jacket at the second end of the jacket, the second open-sided notch being defined by respective first and second surfaces that converge at a second convergence point offset into the jacket from the second end of the jacket, the respective first surface extending from the second convergence point, towards the first side of the jacket and the respective second surface extending from the second convergence point towards the second side of the jacket.

2. The fiber optic cable of claim 1, wherein the first open-sided notch is disposed closer to the first side of the jacket than the second open-sided notch.

3. The fiber optic cable of claim 2, wherein the first open-sided notch is offset from the minor axis.

4. The fiber optic cable of claim 3 wherein the second open-sided notch is offset from the minor axis.

5. The fiber optic cable of claim 1, wherein the first and second strength members are at least twice as large as the core.

6. The fiber optic cable of claim 5, wherein the minor axis defines a thickness of the jacket and wherein each of the first and second strength members has a transverse cross-dimension that extends along a majority of the thickness of the jacket.

7. The fiber optic cable of claim 1, wherein the core includes a buffer layer within which the at least one optical fiber is disposed.

8. The fiber optic cable of claim 1, wherein each of the first and second open-sided notches is provided outside of a boundary defined by first and second lines that are tangent to the core and that are perpendicular to the major axis.

9. The fiber optic cable of claim 1, wherein the first open-sided notch is defined at the first end between the minor axis and the first side of the jacket, wherein a notch is not provided at the first end between the minor axis and the second side of the jacket, wherein the second open-sided notch is defined at the second end between the minor axis and the second side of the jacket, and wherein a notch is not provided at the second end between the minor axis and the first side of the jacket.

10. The fiber optic cable of claim 1, wherein the jacket is tightly extruded about the core.

11. The fiber optic cable of claim 1, wherein the jacket defines a passage extending along the longitudinal axis, the core being loosely disposed within the passage.

12. The fiber optic cable of claim 11, further comprising a third strength member disposed within the passage between the core and the jacket.

13. The fiber optic cable of claim 12, wherein the third strength member is water soluable.

14. The fiber optic cable of claim 12, wherein the third strength member is one of a plurality of strength members disposed within the passage, the strength members within the passage being positioned to inhibit the core from adhering to the jacket during extrusion of the jacket around the core.

15. The fiber optic cable of claim 14, wherein the plurality of strength members disposed within the passage includes two strength members disposed within the passage.

16. The fiber optic cable of claim 11, wherein the passage is smaller than the first and second strength members.

17. The fiber optic cable of claim 1, wherein the first and second ends of the cable are parallel to each other.

18. The fiber optic cable of claim 1. wherein each of the first and second open-ended notches is symmetrical about a respective reference plane extending through the notch and parallel with the minor axis.

* * * * *